A. A. OLSON.
BOILER CLEANER.
APPLICATION FILED OCT. 7, 1920.
1,418,670.  Patented June 6, 1922.
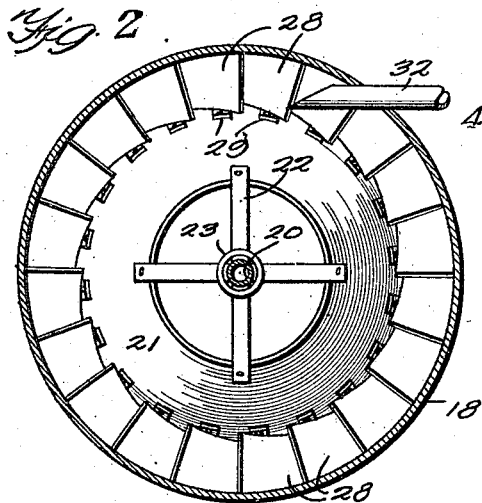
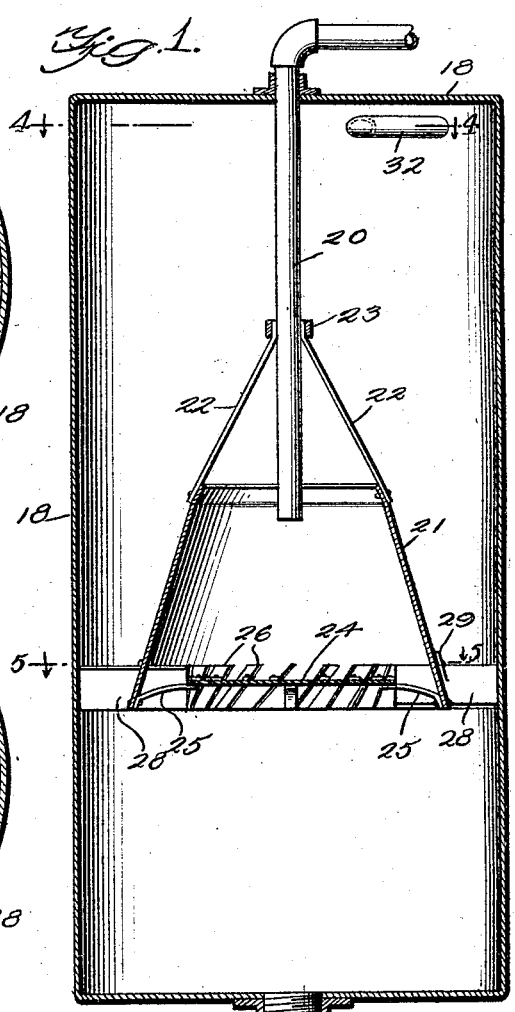
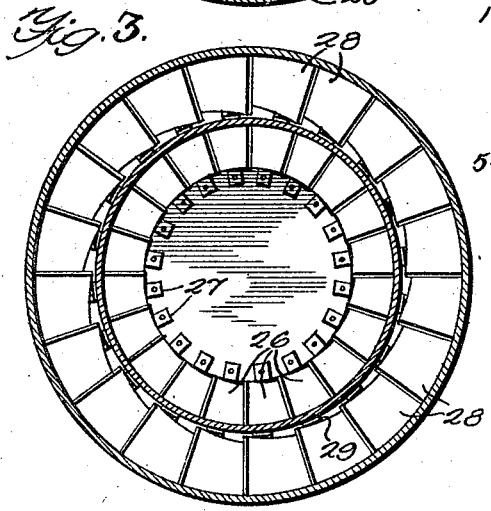
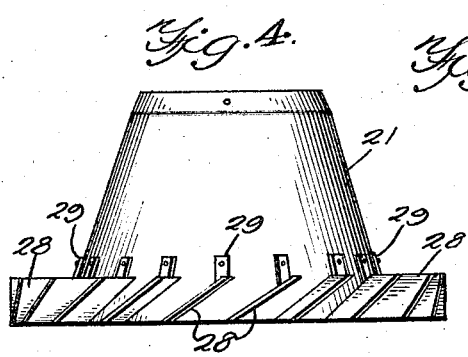
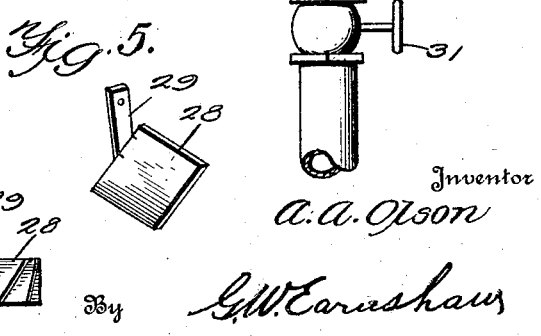
Inventor
A. A. Olson
By G. W. Earnshaw
Attorney

UNITED STATES PATENT OFFICE.

ALFRED A. OLSON, OF CARDIN, OKLAHOMA.

BOILER CLEANER.

1,418,670.　　　　Specification of Letters Patent.　　Patented June 6, 1922.

Application filed October 7, 1920. Serial No. 415,314.

*To all whom it may concern:*

Be it known that I, ALFRED A. OLSON, a citizen of the United States, residing at Cardin, in the county of Ottawa and State of Oklahoma, have invented certain new and useful Improvements in Boiler Cleaners, of which the following is a specification.

This invention relates to sediment tanks for boiler cleaners and is an improved apparatus for removing foreign matter and impurities from the water in a steam boiler, to minimize the lodgment of sediment and prevent the formation of scale. It has long been a recognized fact that in making steam in a tubular boiler, the violent action of the applied heat greatly agitates the water causing the foreign matter to rise near the surface; and further that so far as approximately the same heat as within the boiler is maintained, the foreign matter will follow the water in a surface discharge.

The present invention comprises a sediment tank to which water containing impurities is delivered by means of a pivoted floating skimmer to collect the impurities within the boiler, a pipe connected thereto at the smaller end, leading outside to a conveniently located sediment tank, said pipe between the boiler and sediment tank being covered with insulating material to maintain the temperature of its contents; a sediment tank, a cone shaped deflector open at the top, arranged in the sediment tank with the end of the connecting pipe discharging within, a diaphragm arranged within the cone and partially closing the bottom thereof, the diaphragm being provided with a plurality of spiral blades around its outer circumference and within the cone, and a plurality of spiral blades attached to the lower outside circumference of the cone and occupying the space between the cone and the inner wall of the tank, the purpose of the two sets of spiral blades being to create a whirling motion in the water forced through the tank when all the valves leading to and from the tank are opened for the purpose of removing sediment therefrom; an outlet pipe arranged near the top of the tank for the return of clear water to the lower portion of the boiler, it being understood both the sediment tank and the pipe for the return water to the boiler are to remain exposed to the lower temperature outside to facilitate the deposition of the sediment within the tank and the return action of the water to the boiler.

In the accompanying drawings, I have shown one embodiment of the invention. In this showing, Figure 1 is a vertical sectional view of the sediment tank.

Figure 2 is a sectional view on the line 4—4 of Figure 1.

Figure 3 is a similar view on the line 5—5 of Figure 1.

Figure 4 is a detail side elevation of the cone, and

Figure 5 is a detail perspective view of one of the blades.

Referring to the drawings, a sediment tank 18 is arranged in any convenient position, and is connected to the boiler by a pipe 20. The end of the pipe 20 extends downwardly into the tank and a cone 21 is arranged over the end of the pipe. As shown, the cone is supported by a plurality of arms 22 which are secured to a ring 23 arranged on the pipe. A plate or diaphragm 24 is arranged near the bottom of the cone and forms a partial closure therefor. This plate may be supported by arms 25 secured to the cone. As shown, a plurality of spiral blades 26 are arranged in the space between the edge of the plate and the walls of the cone. These blades are provided with attached members 27 secured to the plate. A second set of blades 28 are arranged on the outside of the cone in the space between the cone and the inner wall of the tank. The detail construction of this blade is shown in Figure 5 of the drawings. As shown, the blades are provided with arms or extensions 29 by which they are secured to the cone.

The lower end of the tank is provided with a blow-off pipe 30 having a valve 31 therein.

The operation of the device is as follows:

The water from the boiler enters the tank through pipe 20 and is delivered to the interior of the cone 21. After passing from the pipe 20 into the cone 21, it strikes the diaphragm which deflects it in an upward movement through the top of the cone where it comes in contact with the cooler temperature of the sides of the tank 18. The action is such that the heavier particles of sediment will follow down the interior walls of the cone 21 while the lighter particles of sediment will settle on and follow down outside the cone 21, the settling process being facilitated by the lower temperature. The sediment passes through the spaces between the blades 26 and 28 to the bottom of the tank 18, and may be withdrawn from time to time through the blow-off pipe 30 by opening the valve 31, while both valves 17 and 34 are still open. An outlet pipe 32 is arranged near the top of the tank communicating with the water compartment of the boiler by pipe 33 in which is located an emergency valve 34. The clear water is returned to the boiler through this pipe.

During the cleaning operation, with the valve 31 open, the boiler pressure forces water and steam into the tank 18 through pipes 20 and 32. The water and steam delivered through pipe 32 is given a spiral motion in the upper portion of the tank, and the passage of the water through the blades 26 and 28 increases this motion and insures removal of all sediment from the tank.

It is to be understood that while I have described the preferred embodiment of my invention, various changes in the shape, size, and arrangement of parts may be resorted to without departing from the spirit of the invention or the scope of the subjoined claims.

Having thus described my invention, I claim:

1. In a sediment tank, a pipe to deliver water from a boiler to said tank, a cone supported in said tank, said pipe having its outlet arranged in said cone, a baffle plate arranged in said cone, the edges of said plate being spaced from the walls of the cone, and spiral blades arranged in said space.

2. In a sediment tank, a pipe to deliver water from a boiler to said tank, a cone supported in said tank, said pipe having its outlet arranged in said cone, a baffle plate arranged in said cone, the edges of said plate being spaced from the walls of the cone, spiral blades arranged in said space, and a second set of blades arranged between the cone and the outer wall of the tank.

In testimony whereof I affix my signature in presence of two witnesses.

ALFRED A. OLSON.

Witnesses:
 ETHEL WRIGHT,
 GROVER C. JAMES.